United States Patent [19]

Sutphin

[11] 4,231,863

[45] Nov. 4, 1980

[54] METHOD AND APPARATUS FOR TREATING WATER

[76] Inventor: Eldon M. Sutphin, 306 Field Club Ridge Rd., Pittsburgh, Pa. 15238.

[21] Appl. No.: 33,350

[22] Filed: Apr. 26, 1979

[51] Int. Cl.$^2$ .............................................. C02C 1/08
[52] U.S. Cl. .................................... 210/615; 210/151; 210/195.3; 210/607; 210/629
[58] Field of Search .................. 210/7, 11, 14, 17, 44, 210/83, 84, 150, 151, 195.3, 220, 221 R, 221 P, 519, 521, 15; 261/124, 77

[56] References Cited

U.S. PATENT DOCUMENTS

| | | | |
|---|---|---|---|
| 2,188,162 | 1/1940 | Schulhoff | 210/17 |
| 2,744,065 | 5/1956 | Lacey | 261/77 |
| 2,802,647 | 8/1957 | Bolton | 210/14 |
| 3,371,033 | 2/1968 | Simmons | 210/151 |
| 3,452,966 | 7/1969 | Smolski | 261/124 |
| 3,529,725 | 9/1970 | Fifer | 210/220 |
| 3,547,815 | 12/1970 | McWhirter | 210/220 |
| 3,575,849 | 4/1971 | Torpey | 210/14 |
| 3,589,518 | 6/1971 | Brebion | 210/150 |
| 3,724,667 | 4/1973 | McKinney | 210/7 |
| 3,878,097 | 4/1975 | Mochizuki | 210/220 |
| 3,968,086 | 7/1976 | Romanowski | 261/77 |
| 3,969,446 | 7/1976 | Franklin | 261/77 |
| 4,088,571 | 5/1978 | Helgesson | 210/17 |
| 4,093,549 | 6/1978 | Wilson | 210/220 |
| 4,139,456 | 2/1979 | Yabuuchi | 210/17 |

FOREIGN PATENT DOCUMENTS 2420744 10/1975 Fed. Rep. of Germany ........... 210/151

Primary Examiner—Ernest G. Therkorn
Attorney, Agent, or Firm—O'Rourke & Harris

[57] ABSTRACT

Method and apparatus for purifying water or treating waste water by utilizing a gaseous medium, and particularly oxygen or air, to lift the water through a biological reactor in the form of a plurality of substantially vertical conduit members positioned over a manifold member through which the gas is supplied to the conduit. Preferably, when pure oxygen is employed, the system is sealed and utilizes a carbon dioxide absorber. Optionally, particles may be included in the water being treated.

25 Claims, 6 Drawing Figures

METHOD AND APPARATUS FOR TREATING WATER

BACKGROUND OF THE INVENTION

1. Field of the Invention

The present invention relates generally to treatment of water, and more particularly to treatment of waste water utilizing a plurality of adjacent conduit members positioned to receive an air flow or gas flow therethrough to lift and circulate the water to be treated. Preferably, the gas utilized is air or oxygen and provides for aerobic biological treatment of the water. Optionally, particles may be added to the solution to increase the surface area carrying the desirable biota.

2. Description of the Related Art

An early process utilized to purify or treat water such as waste water was the Trickling Filter Process. Initially, this aerobic biological process involved trickling the water to be treated over a bed of rocks. The process evolved to the use of plastic to provide a receptive, enlarged surface area for the biota. Accordingly, greater surface area could be provided in a given volume and the reduction in weight enabled towers as high as forty feet to be employed. The process was further improved by recycling a portion of the effluent back over the biota. However, while the biota cultivated on the plastic surface is efficient and effective in removing contaminants, energy requirements to pump the water and a desirable recycle stream to such heights are substantial.

The Activated Sludge Process was developed after the Trickling Filter Process to provide for more thorough treatment of waste water contaminants and facilitate treatment of large quantities of waste water. Like the Trickling Filter Process the Activated Sludge Process is an aerobic biological process and depends upon providing substantial amounts of oxygen to the micro-organisms comprising the biota. Rapid mixing is essential to contact the micro-organisms with the contaminant which serves as nourishment for the micro-organisms. A clarifier is required in the Activated Sludge Process. Basically, a clarifier provides a quiescent volume which allows the activated sludge in the form of colonies of micro-organisms to settle and thus be conveniently available for removal from the clarifier. Clarified water is removed from another zone of the clarifier. A recent improvement to the Activated Sludge Process involves the addition of activated carbon particles to the reactor. The activated carbon absorbs the contaminants and thus provides a greater resident time for the micro-organisms to consume the contaminants as nourishment.

Rotating biological films or discs were developed as an improvement over the Trickling Filter Process in order to treat large flows and avoid the prohibitive energy demands required to pump waste water to the top of high towers. Typically, large discs rotate at a rate of about 1 to 5 rpm to enable biota to build up on the surface of the disc. Since the disc is partially in the water and partially in the atmosphere, oxygen is supplied to the biota as the disc rotates out of the water into the surrounding atmosphere. Nourishment, in the form of contaminants in the waste water, is provided to the biota as the disc carrying the biota rotates through the waste water. However, the process is limited by the relatively low rate at which the disc can be rotated. Biota colonies carried on the disc are rather fragile and will not withstand substantial disturbance resulting from the discs moving through the waste water in conjunction with centrifugal force resulting from even moderate rotational speeds.

Thus the prior art generally relates to processes which are effective but relatively slow and/or energy intensive in treating water. Accordingly, an advantage of the instant invention is a compact, efficient biological reactor which is effective and efficient in reducing the contaminants in water.

Another advantage of the instant invention is the efficiency resulting from the use of gas to aerate and circulate the waste water over a compact volume having great surface area to support biota growth.

Yet another advantage of the instant invention is the vigorous mixing and aeration of the water to be treated thereby providing oxygen and nourishment in the form of contaminants to the biota growth on the biological reactor.

These and other advantages of the instant invention will become apparent from the following description.

DETAILED DESCRIPTION OF THE INVENTION

Figure 1:
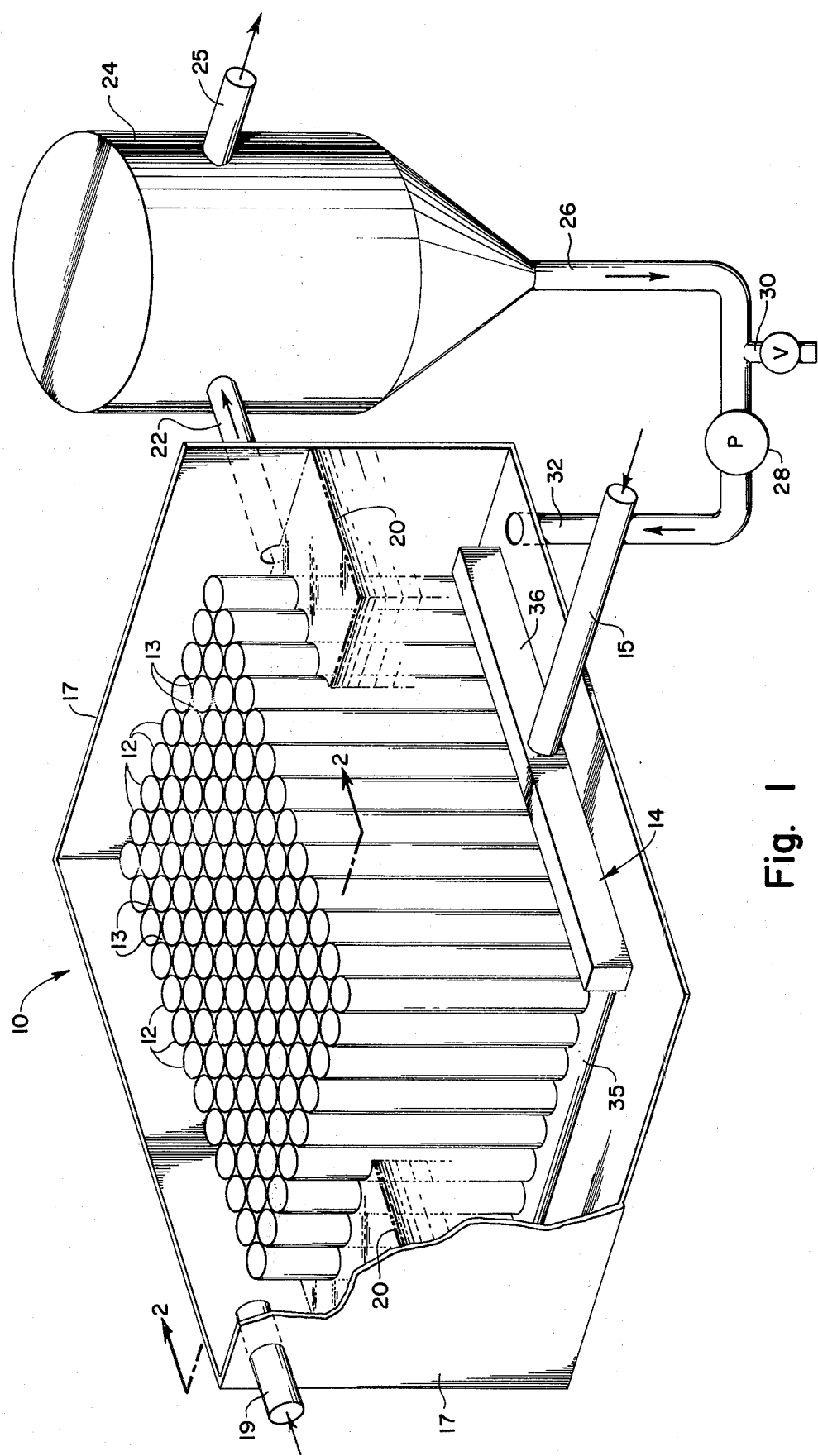
FIG. 1 is a perspective view, partially cut away of a biological reactor in accord with the instant invention.

With reference to the drawings, wherein like components are designated by like reference numerals throughout the various figures, a biological reactor is illustrated in FIG. 1 and generally designated by the reference numeral 10. As illustrated, biological reactor 10 is formed of a plurality of conduits 12, which are open-ended tubular members preferably of circular cross section, but operably of various cross sections such as square, hexangular, etc. It is desirable that conduits 12 be positioned in an adjacent but spaced relationship to provide openings 13 therebetween. Manifold 14 is positioned below conduits 12 and connected to gas inlet 15. Gas inlet 15, in turn, is connected to a pressure source (not shown) for the gas.

Biological reactor 10 is supported and surrounded by enclosure 17. Inlet 19, through which water to be treated is conducted, provides flow into enclosure 17. Water level 20 in enclosure 17 is controlled by outlet 22 which is connected to clarifier 24. Clarifier 24 is an enlarged volume container for after treatment of the water to facilitate separation of sludge entrained with the water flowing through outlet 22 from enclosure 17. While not critical, clarifier 24 is a desirable addition to improve operation of biological reactor 10. Sludge and treated water are separated in clarifier 24 with the treated water exiting through treated water outlet 25 and the sludge, which is primarily micro-organisms, recycling through sludge outlet 26. Pump 28 draws sludge from clarifier 24 through sludge outlet 26 to either, as is determined by the operator, sludge outlet 30, illustrated as a manual valve, or sludge return 32 in enclosure 17.

Figure 3:
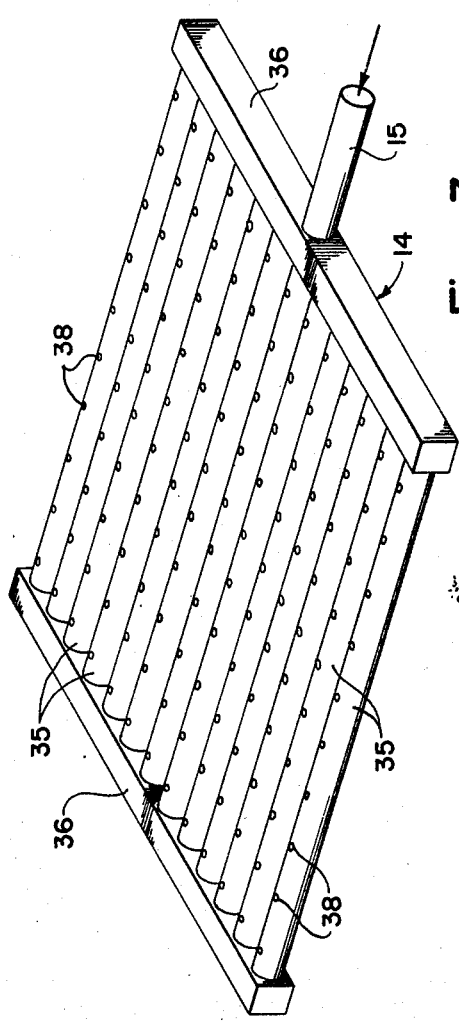
FIG. 3 is a perspective view of a typical manifold arrangement as utilized in the biological reactor shown in FIG. 1.
Figure 4:
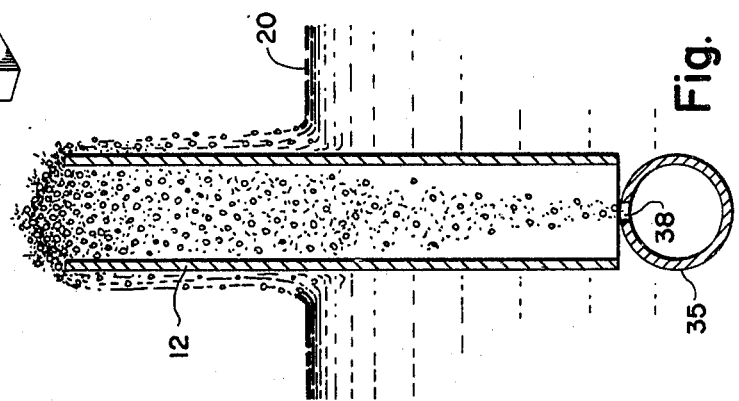
FIG. 4 is a section view of a single conduit and associated manifold of the biological reactor shown in FIG. 1.
Figure 2:
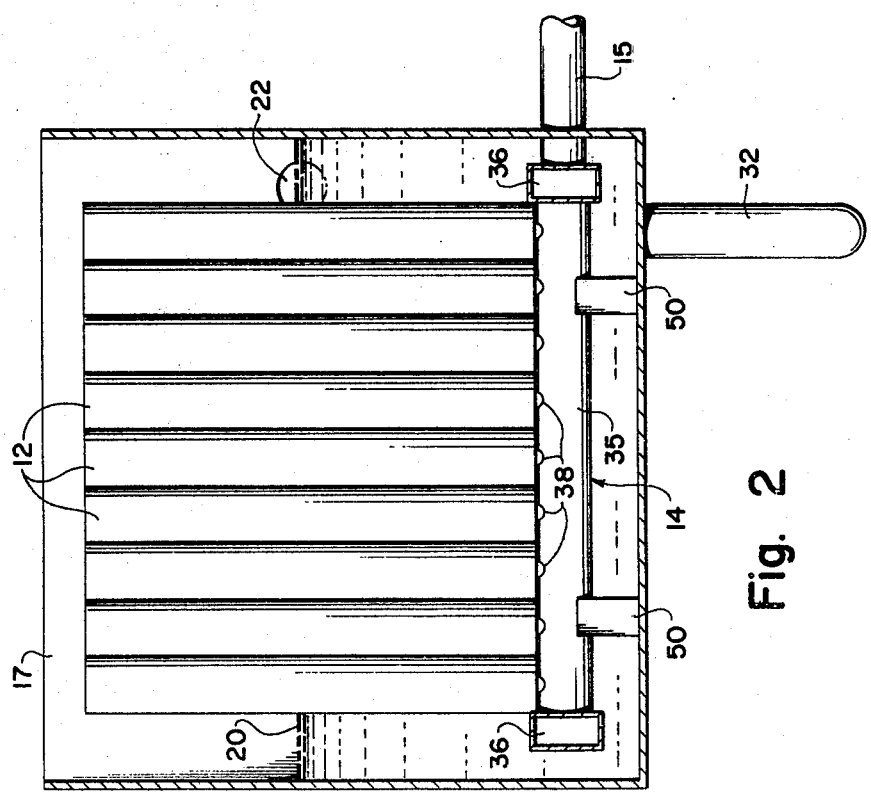
FIG. 2 is a section of the biological reactor shown in FIG. 1 along section line 2—2.

The operation of biological reactor 10, as illustrated in FIG. 1, will be more readily understood with references to FIGS. 2, 3 and 4. As shown in FIG. 2, manifold 14 is positioned immediately below conduits 12 and spaced therefrom. Manifold 14 is formed of manifold tubes 35 positioned between headers 36 at either end thereof and having defined therein gas orifices 38 positioned with a gas orifice 38 immediately below each conduit 12. Accordingly, as shown in FIG. 4, gas under pressure, and preferably air or oxygen, is provided to manifold tube 35 and metered through gas orifice 38 in a manner such as to agitate and aerate water in conduits 12. The gas aerates and agitates water in conduit 12. The aerated water, being of a lower density than the water in enclosure 17, is displaced upward to the top of conduit 12 and spills thereover in a more or less frothy or aerated manner. Both the inner and outer surfaces of conduit 12 are appropriate for the cultivation of biota. The biota, though fragile, is compatible with relatively strong agitation of the aerated water in conduit 12. Accordingly, both oxygen and nutrition in the form of contaminants in the turbulent water, are rapidly replenished when consumed by the biota. Accordingly, the kinetics, both of growth of the biota, and the consumption of contaminants by the biota, are greatly enhanced.

Figure 5:
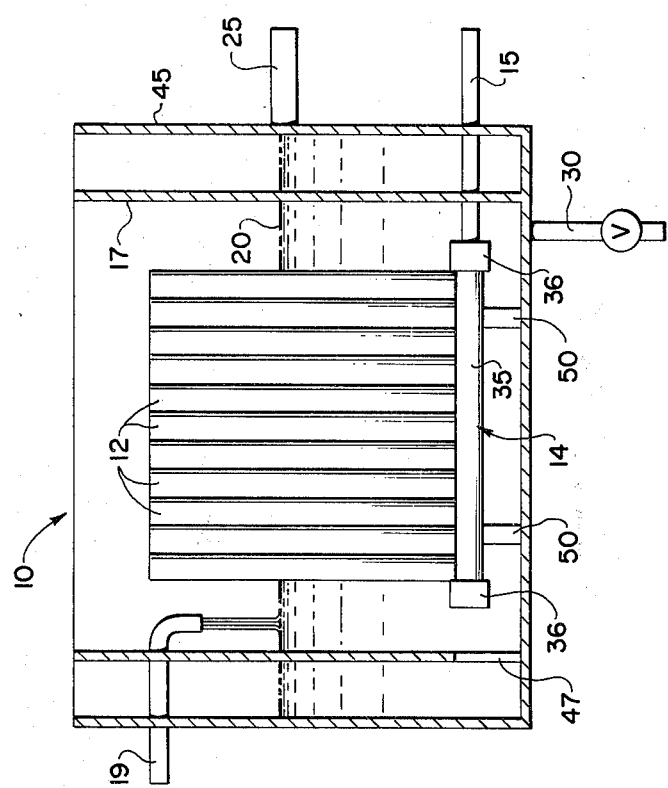
FIG. 5 is a cross sectional view of a biological reactor as used in another embodiment of the instant invention.

Another embodiment similar in operation to that of FIG. 1, but employing somewhat different structure is illustrated in FIG. 5. While much of the structure is identical to that of FIG. 1, i.e., inlet 19, water level 20, manifold tubes 35, header members 36 and treated water outlet 25, it is to be noted that the embodiment of FIG. 5 includes an outer tank 45 which surrounds enclosure 17 and defines a volume therewith. Openings 47 are defined through enclosure 17 such that water treated by biological reactor 10 flows from enclosure 17 through opening 47 to the volume defined by outer tank 45. Thus the volume between enclosure 17 and outer tank 45 in effect serves as a clarifier. As discussed with regard to the clarifier of FIG. 1, such volume communicates with treated water outlet 25 and sludge outlet 30 as illustrated. Also, while it is to be understood that biological reactor 10 may be supported in a great number of manners, as shown in FIG. 5, manifold 14 is carried on the floor of enclosure 17 by supports 50. Conduits 12 are in turn supported from manifold 14. Thus it is to be appreciated that the preferred embodiment of FIG. 5, which is particularly adapted to utilize air as the lifting and aerating gas, is the functional equivalent of the embodiment of FIG. 1, but utilizes a clarifier structure which is integral with the flow through the openings 47 to the space defined by outer tank 45 and enclosure 17.

Figure 6:
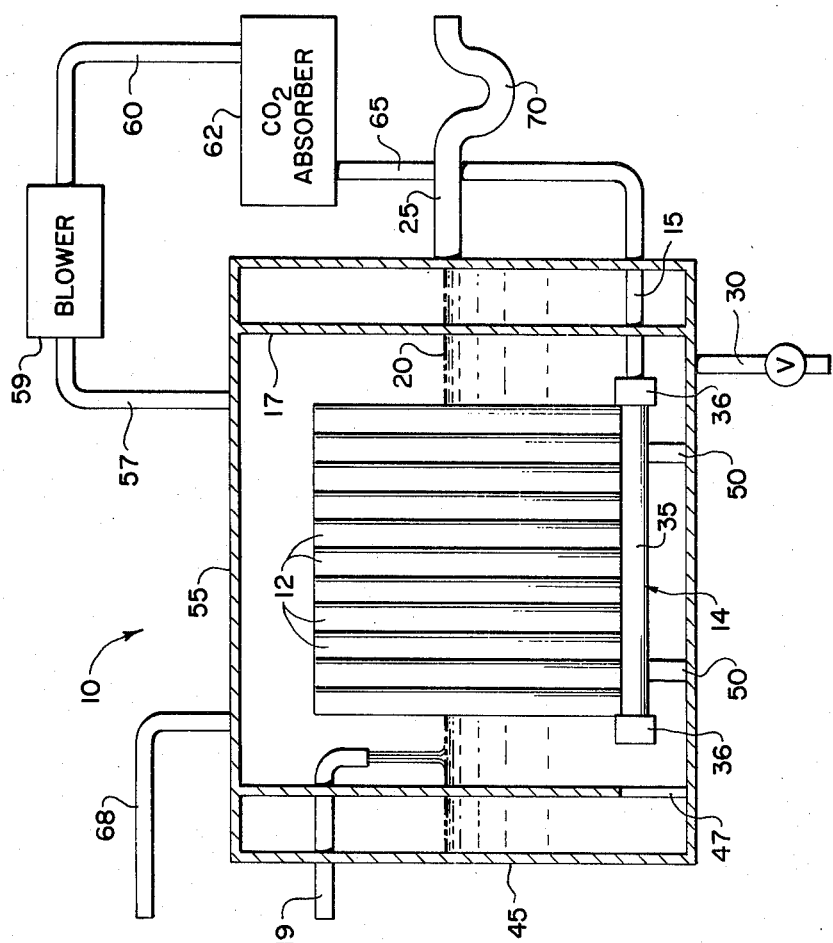
FIG. 6 is a cross sectional view of yet another embodiment of the biological reactor in accord with the instant invention.

Another embodiment, as illustrated in FIG. 6, is quite similar to the structure discussed with reference to FIG. 5. However, as illustrated in FIG. 6, the normally open upper portions of enclosure 17 and outer tank 45 are closed by top 55 extending thereacross. Also, gas outlet 57, communicating through top 55, is provided to vent gas from the volume enclosing biological reactor 10. This arrangement is particularly useful when substantially pure oxygen is employed as the operative gas.

Accordingly, vent 57 is connected to a blower 59 which conducts the treatment gas through line 60 to carbon dioxide absorber 62. Carbon dioxide absorber 62 may be any of the conventional means for this purpose, but is conveniently a tower including, for instance, sodium carbonate, sodium hydroxide, potassium hydroxide or other such aqueous solutions known to absorb substantial quantities of carbon dioxide. As is well known in the art, the carbon dioxide may be desorbed from the solution by changing conditions, such as temperature, to reduce the solubility of carbon dioxide in the liquid.

After excess carbon dioxide, which is a by-product of treatment of contaminants by the biota, is removed, the remaining oxygen is conducted through lines 65 to gas inlet 15 to serve as the aerating gas to carry the liquid up through conduits 12. Makeup oxygen is supplied to the system from a source (not shown) at oxygen inlet 68. A trap 70 is preferably included at water outlet 25 to prevent loss of oxygen with treated water. While the cost and complication of using oxygen is greater than required for atmospheric air, the efficiency of the biological reactor is of course greatly enhanced if pure oxygen is employed. Particularly in instances where weight and/or space is important, i.e., shipboard installations, the use of pure oxygen may be quite desirable.

From the above discussion, it will be apparent to those skilled in the art that the treatment of waste water will substantially reduce Total Organic Carbon, Biochemical Oxygen Demand and Chemical Oxygen Demand, oil and grease, Total Suspended Solids and turbidity. This is accomplished in a rapid and efficient manner primarily as a result of the agitation and mixing of the gas, which provides both oxygen and nutrients to the biota, as the gas carries the water upward through the conduits. While the biota is fragile and may be thrown from a surface by relatively low centrifugal force, resistance to turbulence and agitation is substantially greater. Thus the biota is able to withstand velocities of about 11 feet per second in terms of water flow over the surface thereof. However, somewhat lower flowrates on the order of 0.3 to 5 feet per second are preferred. A range of 1.5 to 3 feet per second is particularly preferred. In any event, though a certain portion of the biota will of course be detached by the agitated and aerated water flowing thereover, such detached micro-organisms serve to initiate new sites for biota growth on any surface not previously cultivated, provide for a certain amount of in situ treatment of contaminants, and are substantially recovered in the clarifier for recycling through the biological reactor.

The method and structure of the instant invention may be further yet enhanced by the addition of properly selected plastic pellants, spent catalytic cracker and catalyst particles, powdered coke or other such particles such as fly ash particles. Such particles may be added in amounts of up to five percent by weight of the charge rate, but preferably 0.05 to 1 percent by weight of the charge rate is preferred. Such particles provide even greater surface area and support growth of biota thereon as the water travels through the biological reactor. A certain number of particles may be adhered to the walls of the biological reactor, thereby presenting even greater surface area. A particularly preferred particle is one having a density only slightly heavier than water thereby providing for flow with the water through the biological reactor yet permitting separation in the clarifiers for recycling and or removal from the treated water.

The nature and advantages of the instant invention will be more readily appreciated with reference to the following examples.

EXAMPLE I

Two activated sludge reactors, each having a five gallon capacity and an annulus clarifier, but one being operated with powdered refinery coke to provide additional surface area for micro-organisms, were each stirred with a one-quarter horse power lightening mixer and ample air supplied thereto by an air diffuser. A biological reactor substantially as described above with reference to FIG. 1 and having a five gallon capacity and an annulus clarifier was prepared. The biological reactor consisted of 144 three-eighth inch OD polyvinyl chloride tubes twelve inches long placed over a distribution box containing 144 one-sixtyfourth inch holes. Each of the one-sixtyfourth inch holes were placed under one of the 144 polyvinyl chloride three-eighth inch tubes with approximately one-quarter inch space between the bottom of the tube and the top of the distribution plate. The reactor tubes were placed with two inches thereof extending above the water line in an enclosure, and accordingly ten inches below the water level. Two cubic feet per minute of air was supplied to the distribution box. Table I summarizes the results of a five day comparison of waste water purification from each of the three reactors. The data presented was collected each day of the five day period and averaged. Feed to each of the reactors was from a common tank and thus the same waste water was provided to each reactor.

TABLE I

| | Feed | Activated Sludge Reactor | Activated Sludge Reactor With Added Powdered Coke | Biological Reactor |
|---|---|---|---|---|
| Dissolved Oxygen, ppm | — | 3.2 | 3.5 | 6.4 |
| Total Organic Carbon, ppm | 111 | 16 (86%) | 12 (89%) | 11 (90%) |
| Chemical Oxygen Demand, ppm | 431 | 93 (78%) | 68 (84%) | 54 (87%) |
| Biochemical Oxygen Demand, ppm | 215 | 30 (86%) | 13 (94%) | 8 (96%) |
| Oil & Grease, ppm | 63 | 19 (70%) | 8 (87%) | 4 (94%) |
| Turbidity JTU | 49 | 18 (63%) | 7 (86%) | 3 (94%) |
| Feed rate, ml/min | — | 26 | 26 | 50 |
| Residence Time, hours | | 12.1 | 12.1 | 6.3 |

(%) Percent Reduction

As is apparent from Table I, the biological reactor, even without the benefit of added particles such as the powdered coke utilized with one of the activated sludge reactors, in every instance provided substantially improved treatment with almost double the feed rate and almost half the residence time.

EXAMPLE II

A similar comparison to that described in Example I utilizing the biological reactor of Example I was made also utilizing a forty-seven inch rotating disc pilot plant reactor with clarifier. While the biota on the rotating disc had been built up over a two month period and equilibrated with the common waste water feed for twelve days prior to the two day test period, the biological reactor had been cleaned five days before the two day test period and thus the maximum amount of biota may not have been produced. The data from the two day period were averaged and summarized in Table II.

As is apparent from Table II the biological reactor, having lower actual surface area, and lower equivalent surface area calculated upon dynamic blow, again provided improved treatment in every instant. Thus, it is apparent that the dynamic mixing and distribution of nourishment in the form of contaminants and oxygen provides for rapid treatment of the contaminants. Though the biological reactor utilizes energy to accomplish such mixing, the energy is very efficiently used so that the gas, in the preferred embodiment, both aerates the water for purposes of lifting, and also for purposes of providing oxygen to the micro-organisms. Thus, with efficient use of energy and little lift of the water, greatly enhanced treatment rates are accomplished.

Although only several embodiments of the present invention have been illustrated and described, it is anticipated that various changes and modifications will be apparent to those skilled in the art, and that such changes and modifications may be made within the scope of the following claims.

TABLE II

| | Feed | Bio Disks | Biological Reactor |
|---|---|---|---|
| Dissolved Oxygen, ppm | 4.0 | 6.1 | 8.5 |
| Total Organic Carbon, ppm | 54 | 16 (70%) | 9 (83%) |
| Chemical Oxygen Demand, ppm | 377 | 64 (83%) | 34 (91%) |
| Total Suspended Solids, ppm | 119 | 11 (91%) | 6 (95%) |
| Oil & Grease, ppm | 51 | 12 (76%) | 8 (84%) |
| Turbidity JTU | 45 | 11 (76%) | 5 (89%) |
| Surface Area, Square Feet | — | 1960 | 40 |
| Rotation Speed, RPM | — | 2.8 | — |
| Feed Rate ml/square foot/min. | — | 2.7 | 1.3 |
| Volume Turnovers in Reactor Pile, per min. | — | — | 89 |
| Equivalent Surface Area per min. square feet/min. | — | 5488 | 3560 |
| Peripheral Velocity of disk, feet per second | — | 0.55 | — |
| Internal Velocity of Reactor Pile Tubes, feet per second | — | — | 1.48 |

(%) Percent Reduction

What is claimed is:

1. Apparatus for treating water containing contaminants comprising:
   an enclosure closed on the bottom portion thereof and adapted to hold water therein;

a plurality of substantially vertical open ended conduit members adapted to support biota growth thereon and positioned in mutually adjacent, close packed relationship in adjacent rows of several conduit members each with openings defined between the adjacent conduit members;

gas distribution means having a plurality of gas outlets positioned with at least one gas outlet adjacent the open bottom portion of each conduit member; and means for maintaining a water level which at least partially immerses the conduit members;

whereby gas may be expelled through the gas distribution orifices into each conduit member to aerate and lift the water to the top portion of the conduit thereby producing flow upward through the conduit members and downward there between thereby exposing the contaminated water to the inner and outer surfaces of the conduit members.

2. Apparatus as set forth in claim 1 in which the conduit members are tubes of circular cross section and the gas distribution means comprise a manifold positioned immediately below the conduit members.

3. Apparatus as set forth in claim 1 which the means for maintaining the water level comprises an enclosure in which the water is contained during treatment, and further clarifier means communicating with the enclosure for flow through an inlet into the clarifier means, an upper clarifier outlet for treated water, and a lower clarifier outlet for solid matter.

4. Apparatus as set forth in claim 3 in which the clarifier means comprises a container communicating with the enclosure through the clarifier inlet, and having the lower clarifier outlet connected to the enclosure.

5. Apparatus as set forth in claim 3 in which the clarifier means comprises a tank surrounding the enclosure and communicating therewith through at least one opening defined in a lower portion of the enclosure sidewall, whereby water may flow through the opening from the enclosure to the tank.

6. Apparatus as set forth in claim 1 in which the conduit members and gas distribution means are maintained in a sealed system, and also including a $CO_2$ absorber means is provided communicating with the sealed system, whereby oxygen maybe maintained within the sealed system and $CO_2$ removed from the oxygen.

7. Reactor apparatus as set forth in claim 1 in which the conduit members are at least partially covered with biota.

8. Biological reactor apparatus for treating water, comprising;

an enclosure closed on the sidewalls and the bottom portion thereof and adapted to hold water therein;

a plurality of substantially vertical, open ended conduit members adapted to support biota growth thereon and positioned in mutually adjacent, close packed relationship in adjacent rows of several conduit members each with openings defined between the adjacent conduit members;

gas distribution means positioned below the bottom portion of the conduit members, the gas distribution means including a plurality of gas orifices arranged with an orifice adjacent and below the open bottom portion of each conduit member; and clarifier means communicating with the interior of the enclosure and including an outlet therefrom for treated water.

9. Biological reactor apparatus as set forth in claim 8 in which the clarifier means comprises a container communicating with the enclosure below the water line whereby and through the clarifier inlet, having a lower clarifier outlet connected to the enclosure, and an upper clarifier outlet.

10. Biological reactor apparatus set forth in claim 8 in which the clarifier means comprise a tank surrounding the sidewalls of the enclosure and communicating with the enclosure through at least one opening defined in a lower portion of the enclosure sidewall, the surrounding tank further having a water outlet member defined there through and adapted to maintain the water level within the surrounding tank and enclosure to at least partially immerse the conduit members.

11. Biological reactor apparatus as set forth in claim 8 in which the enclosure is closed at the top thereof, and in which a carbon dioxide absorber is connected to the interior of the enclosure.

12. Biological reactor apparatus as set forth in claim 8 in which the conduit member carry colonies of biota.

13. A method for treating water containing contaminants comprising:

flowing gas into the water through a plurality of gas outlets positioned beneath the surface of the water to aerate the water;

collecting the aerated water in a plurality of substantially vertical, open ended conduit members adapted to support biota growth thereon and positioned in mutually adjacent, closed packed relationship in adjacent rows of several conduit members each with openings defined between the adjacent conduit members each with openings defined between the adjacent conduit members;

moving the aerated water upward through the conduit member to contact the contaminated water with the inner surface of the conduit members; and moving the water exiting the top openings of the conduit members downward through the openings defined between the conduit member to contact the contaminated water with the outer surfaces of the conduit members.

14. A method as set forth in claim 13 in which the conduit member includes at least a partial coating of biota.

15. A method as set forth in claim 14 in which the aerated water flow rate is between 0.3 feet per second and 5 feet per second.

16. A method as set forth in claim 13 in which the gas is selected from the group consisting of air, oxygen and mixtures thereof.

17. A method as set forth in claim 16 in which the velocity of the aerated water is not substantially greater than eleven feet per second relative to the surface of the conduit member.

18. A method as set forth in claim 17 in which the flow rate is within the range of 1.5 to 3.0 feet per second.

19. A method as set forth in claim 16 in which the plurality of solid particles are mixed with the water, the particles comprising not more than about 5 percent by weight of the water.

20. A method as set forth in claim 19 in which the particles are present in amounts between 0.05 to 1.0 percent by weight of the water.

21. A method as set forth in claim 19 in which the particles are of a density slightly greater than that of water.

22. A method as set forth in claim 13 in which the water and conduit members are substantially enclosed, in which the gas flowed into the water is oxygen, and in which the gas is conducted from the enclosure through the carbon dioxide absorber and returned to the enclosure.

23. A method as set forth in claim 13 in which a portion of treated water is withdrawn and conducted through a clarifier, and an equal portion of contaminated water introduced.

24. A method for treating contaminated water comprising:

flowing an oxygen containing gas through a plurality of orifices below the surface of a body of contaminated water to aerate the water;

collecting aerated water at the bottom of a plurality of open ended, substantially vertical conduit members positioned in mutually adjacent, close packed relationship in adjacent rows of several conduit members each with flow channels defined between the adjacent conduit members and positioned with each conduit over and adjacent to an orifice;

supplying oxygen and contaminants to colonies of biota covering at least a portion of the inner and outer surfaces of the conduit members by flowing the aerated water upward through the conduits and the water downward between the conduits; and recycling at least a portion of the water through the conduits and removing at least a portion of the water after at least one cycle through the conduits.

25. A method for treating contaminated water as set forth in claim 24 in which the water removed is flowed to a clarifier having a substantially quiescent volume to separate suspended solids from the water.

* * * * *